(12) United States Patent
Dyer

(10) Patent No.: US 6,797,104 B1
(45) Date of Patent: Sep. 28, 2004

(54) OPTICAL COMPOSITE AND METHOD OF MAKING SAME

(76) Inventor: Gordon Wayne Dyer, 12 Murray La., Northwood, NH (US) 03261

( * ) Notice: Subject to any disclaimer, the term of this patent is extended or adjusted under 35 U.S.C. 154(b) by 0 days.

(21) Appl. No.: 09/669,831

(22) Filed: Sep. 26, 2000

(51) Int. Cl.[7] ............................................. B32B 31/28
(52) U.S. Cl. ............................ 156/272.2; 156/275.7; 156/245; 156/228; 264/1.27
(58) Field of Search ................................ 156/102, 104, 156/105, 228, 245, 272.2, 275.5, 285, 286; 219/759; 428/201, 210, 426; 385/115, 123; 65/385, 412; 264/1.27, 1.28

(56) References Cited

U.S. PATENT DOCUMENTS

| | | | |
|---|---|---|---|
| 1,304,421 A | | 5/1919 | Wachter |
| 2,361,589 A | | 10/1944 | Bennett et al. |
| 2,868,075 A | | 1/1959 | Bivens |
| 3,258,356 A | | 6/1966 | Caldwell et al. |
| 3,388,032 A | | 6/1968 | Sanders |
| 3,525,658 A | | 8/1970 | Setz |
| 3,980,399 A | | 9/1976 | Howden |
| 4,543,146 A | * | 9/1985 | Petcen .......................... 156/245 |
| 4,592,947 A | | 6/1986 | Hunter et al. |
| 4,596,589 A | * | 6/1986 | Perry .......................... 65/412 |
| 4,927,480 A | * | 5/1990 | Vaughan .................... 156/228 |
| 5,323,191 A | | 6/1994 | Firtion et al. |
| 5,851,328 A | * | 12/1998 | Kohan ...................... 156/275.7 |
| 6,106,665 A | * | 8/2000 | Wood et al. ............. 156/275.7 |
| 6,165,300 A | * | 12/2000 | Elsner ...................... 156/272.2 |

* cited by examiner

Primary Examiner—Jeff H. Aftergut
Assistant Examiner—John T. Haran
(74) Attorney, Agent, or Firm—Gordon W. Dyer

(57) ABSTRACT

A method for making an optical composite composed of glass and plastic is disclosed. The method can be used to create a photochromic lens of high optical and refractive quality that is both scratch resistant and of high impact resistance. The method can also be used to create a strong sheath and/or cladding for an optic fiber. The method can also be used to create a scratch resistant coating for polycarbonate material, such as bulletproof glass. Vacuum pressure and optical contacting are used to hold the glass and plastic portions together. A flexible, peripheral seal, whose kinetic reaction strength has been enhanced with microwave radiation, is used maintain the vacuum adhesion of the glass and the plastic. This structural seal is located in a peripheral, non-optical portion of the optical composite to minimize any interference the seal may have with the optical function of the composite.

18 Claims, No Drawings

OPTICAL COMPOSITE AND METHOD OF MAKING SAME

BACKGROUND OF THE INVENTION

1. Field of the Invention

The present invention relates to a method for making a composite optical material. More particularly, the present invention provides a method for producing an optically correct composite for use in ophthalmic lens production, bulletproof glass, Plexiglas, windshields, and fiber optics.

2. Description of Related Art

Composite optical materials have been used for many years because of the benefits (optically, structurally, or both) compared to a optical material made from single, uniform substance. Various methods have been used to create composite optical materials ranging from simply gluing different optical materials together to ion sputtering, and vapor or chemical deposition.

In ophthalmic lens production chemical deposition and ion sputtering are used to apply coatings to ophthalmic lenses. Also in the ophthalmic lens industry, anti-reflective coatings are routinely applied by vapor deposition to all types of ophthalmic lenses.

Optical fibers consist of a silica fiber core, cladding, buffer coating, and sheath. The core is usually fused silica, 5–600 gmm or larger in diameter; the larger the core, the more light the fiber can carry. Depending on the fiber and the application, plastic fibers and fibers with different kinds of glass and core diameters are available. These fibers include those that are optimized to carry near-IR, IR, or UV and visible radiation from traditional spectroscopic light sources as well as the intense high-power light from lasers.

The cladding, a thin layer of glass, plastic, or polymer coating with an index of refraction lower than the core, surrounds the core. The function of the cladding is to reflect light back into the core as it moves down the fiber. The buffer coating is a plastic or a polymer that protects the core and cladding from moisture, scratches, and other contamination while imparting additional strength to the fiber.

Claddings are usually silica, but other glasses, silicone, and other polymers may be used, however, the refractive index must be lower than the core to allow light to propagate through the fiber. Because polymer claddings can be removed with a suitable solvent, fibers with polymer-based claddings can be used for applications requiring the internal reflectance properties of the bare fiber in an application called evanescent wave spectroscopy. Such claddings are generally applied in expensive vacuum chambers using plasma-enhanced chemical deposition, the applications reported in the literature and publicized by vendors or users appear to be the tip of the iceberg. In addition, vendor confidence and continued development of fiber-optic-based technologies for spectroscopy are indications that the chemical and chemical process communities are focusing on the technology. However, a shortcoming of the previous claddings, buffer coatings, and sheaths is the expense of their application.

Bulletproof glass, like all polycarbonate products, though strong is prone to optical aberrations. In addition, it is soft and thus must be bonded to another optical material to prevent it from scratching. Its optical clarity is reduced even further when it is laminated to the usual one or more sheets of glass. Also, polycarbonate's low Abbe number makes light dispersion an inherent problem. A related laminated product, windshields, suffers from the same optical limitation. In lamination, the poor optical nature of the interlayer always reduces the final product's optical clarity. Thus, a shortcoming of windshields is that they have poor optical clarity. Because this reduction in optical clarity is accentuated by curvature, another shortcoming of the lamination process is that it limits the resulting bulletproof glass and windshield composites to relatively flat shapes. Further, a shortcoming of the polycarbonate ophthalmic lens industry is that polycarbonate lenses while light, strong and ultraviolet protective, scratch relatively easily, are prone to chemical damage from cleaners, and have relatively poor optics.

What is needed therefore is a way to provide claddings and buffer coatings more cheaply. It would also be desirable to make polycarbonate products such as bullet-proof glass and ophthalmic lenses more scratch resistant, have better optical quality, and even be photochromic by bonding it to the finest optical material known, glass. And, finally, it would also be desirable to allow for curved windshields and to increase passenger safety by allowing the use of cheaper, high tensile strength multi-layered windshields.

SUMMARY

In accordance with the present invention, methods and a composition are provided for producing an optical composite with the optical clarity and scratch-resistance of a glass and the tensile strength of a polymer. In addition, the present invention also provides an optical composite with the optical clarity of a glass, yet protected by the tensile strength of a polymer.

The present invention includes a glass and polymer composite composed of a glass having a shape, a center, a margin; the plastic has a center, a shape adapted to receive the shape of the glass, and a margin; a sealant is disposed between the margin of the glass and the margin of the plastic, whereby the central portions of the glass and the plastic are devoid of the sealant.

The present invention includes having the glass contain metallic compounds selected from the group consisting of silver salts, copper salts gold, palladium, cadmium chalcogenides, noble metal colloids, and ferrites.

The present invention also includes a method of forming a glass and plastic composite using optical contacting to hold the glass and plastic portions together using microwave radiation.

The present invention also includes a method of enhancing the kinetic reaction strength of a sealant using microwave radiation.

The present invention also includes having the glass be photochromic.

The present invention also includes having the plastic, in whole or in part, be selected from the group consisting of polycarbonate, polyurethane, polystyrene, fluorocarbon and polymethylmethacrylate.

The present invention also includes having the sealant be selected from the group consisting of silicones, shellac and lacquer, silane coupling agents, disilyl crosslinker compounds, epoxy resins, crosslinkable polyethylene vinylacetate terpolymer, polyvinyl butyral and polysulfide.

The present invention also includes having the glass and plastic be transparent and refractive.

The present invention also includes having the margin of the glass having at least one appendage and the margin of the plastic defining an aperture shaped for receiving the appendage of the glass.

The present invention also includes having the margin of the plastic having at least one appendage and the margin of the plastic defining an aperture shaped for receiving the appendage of the plastic.

The present invention also includes having the percentage of glass in the composite be between about 0.01 to 99.99%.

The present invention also includes having a microwave-transparent spring-loaded vice adapted to hold together the glass and the plastic.

The present invention also includes having a vice whose spring tension is between about 0.01 to 200 foot pounds.

The present invention also includes having a weighted microwave-transparent, vice adapted to hold together the glass and the plastic.

The present invention also includes having a vice whose holding weight is between about 0.01 to 100 pounds.

The present invention also includes a method of forming a glass and plastic composite by forming a glass having a margin and a center to a particular shape; then forming a plastic having a margin and a center to a shape essentially adapted to receive the shape of the glass; then applying sealant only to the margin of the glass and the margin of the plastic, whereby the center of the glass and the center of the plastic are devoid of the sealant; then placing together the glass and the plastic; then placing the glass and plastic into a vacuum chamber; then applying vacuum pressure to the glass and the plastic; then placing the vacuum chamber into a microwave oven; and then finally, applying microwave radiation to the glass and the plastic for an effective time.

The present invention also includes a method of forming a glass and plastic composite using an applied vacuum pressure of between about 0.01 to 200 torr.

The present invention also includes a method of forming a glass and plastic composite using microwave radiation applied at between about 10 watts to 100,000 watts and a frequency of between about 3 Ghz to 3000 Ghz.

The present invention also includes a method of forming a glass and plastic composite using microwave radiation that is applied for between about 0.01 to 100 minutes.

The present invention also includes a method of forming a glass and plastic composite by forming a glass having a center and a margin to a particular shape; then forming a plastic having a margin and a center to a shape essentially adapted to receive the shape of the glass; then applying sealant only to the margin of the glass and the margin of the plastic, whereby the center of the glass and the center of the plastic are devoid of the sealant; then applying force to the glass and plastic by placing the glass and plastic into a microwave-transparent vice adapted to hold together a glass and plastic composite using microwave radiation that is applied for between about 0.01 to 100 minutes.

The present invention also includes a method of forming a glass and plastic composite using microwave radiation wherein the microwave radiation is applied at between about 10 to 100,000 watts and at a frequency of between about 3 Ghz to 3000 Ghz.

The present invention also includes a method of forming a glass and plastic composite using microwave radiation where sealant is applied to the glass and the plastic before the glass and the plastic are placed together and an effective amount of distilled water is applied to the center of the glass and the center of the plastic before applying the microwave radiation.

The present invention also includes a method of forming a glass and plastic composite, where sealant is applied to the glass and the plastic before the glass and the plastic are placed together, that uses gravity to hold the glass and the plastic together.

The present invention also includes a method of forming a glass and plastic composite, where sealant is applied to the glass and the plastic before the glass and the plastic are placed together, that uses spring tension to hold the glass and the plastic together.

The present invention also includes a method of forming a glass and plastic composite by forming a glass having a center and a margin to particular shape; then forming a plastic having a margin and a center to a shape essentially adapted to receive the shape of the glass; then applying force to the glass and plastic by placing the glass and plastic into a microwave-transparent vice adapted to hold together the shape of the glass and the shape of the plastic; then placing the glass and plastic into a vacuum chamber; then applying vacuum pressure to the glass and the plastic; then placing the vacuum chamber into a microwave oven; then applying microwave radiation to the glass and the plastic; then applying sealant only to the margin of the glass and the margin of the plastic, whereby the center of the glass and the center of the plastic are devoid of the sealant; and finally, applying microwave radiation to the glass and the plastic for an effective time.

The present invention also includes a method of forming a glass and plastic composite, that uses gravity to hold the glass and the plastic together, where sealant is applied to the glass and the plastic after the glass and the plastic are placed together and before applying microwave radiation to the glass and the plastic.

The present invention also includes a method of forming a glass and plastic composite, that uses spring tension to hold the glass and the plastic together, where sealant is applied to the glass and the plastic after the glass and the plastic are placed together and before applying microwave radiation to the glass and the plastic.

The present invention also includes a method of forming a glass and plastic composite using microwave radiation where sealant is applied to the glass and the plastic after the glass and the plastic are placed together and an effective amount of distilled water is applied to the center of the glass and the center of the plastic before applying the microwave radiation.

The present invention also includes a method of forming a glass and plastic composite, where sealant is applied to the glass and the plastic after the glass and the plastic are placed together and before applying microwave radiation to the glass and the plastic, where vacuum pressure is applied for between about 0.01 to 200 torr.

The present invention also includes a method of forming a glass and plastic composite, where sealant is applied to the glass and the plastic after the glass and the plastic are placed together and before applying microwave radiation to the glass and the plastic, where the microwave radiation is applied for between about 0.01 to 100 minutes.

The present invention also includes a method of forming a glass and plastic composite, where sealant is applied to the glass and the plastic after the glass and the plastic are placed together and before applying microwave radiation to the glass and the plastic, where the microwave radiation is applied for between about to 100,000 watts and a frequency of between about 3 Ghz to 3000 Ghz.

The present invention also includes a method of forming a glass and plastic composite, where sealant is applied to the glass and the plastic after the glass and the plastic are placed together and before applying microwave radiation to the glass and the plastic, where the microwave radiation is applied for between about 0.01 minutes to 100 minutes.

The present invention also includes a glass and plastic composite formed by joining a glass having a margin and a center and a particular shape to a plastic having a margin and a center to a shape essentially adapted to receive the shape of the glass; then applying sealant only to the margin of the glass and the margin of the plastic, whereby the center of the glass and the center of the plastic are devoid of the sealant; then placing together the glass and the plastic; then placing the glass and plastic into a vacuum chamber; then applying vacuum pressure to the glass and the plastic; then placing the vacuum chamber into a microwave oven; and then finally, applying microwave radiation to the glass and the plastic for an effective time.

It is a characteristic of the present invention to provide a method of bonding together glass and plastic, while maintaining their original optical clarity.

It is a characteristic of the present invention to provide method to prevent plastic from becoming scratched by protecting it with a layer of glass.

It is a characteristic of the present invention to provide a method to prevent glass from becoming damaged by protecting it with a layer of plastic.

It is a characteristic of the present invention to provide a method to provide glass-like optical characteristics to plastic by bonding the plastic to a rigid glass surface.

It is a characteristic of the present invention to provide method of making a glass and plastic composite that is photochromic and capable of being performed by optical labs of diverse size.

It is a characteristic of the present invention to provide a method of differentially heating the glass and the plastic during the bonding process of forming the resultant optical composite.

It is a characteristic of the present invention to provide a method of optically contacting together the glass and the plastic during the bonding process of forming the resultant optical composite using microwave radiation.

DETAILED DESCRIPTION OF THE INVENTION

The description of the present invention is organized as follows: a general description, including a description of operation of one embodiment is described, then alternative embodiments are described.

The optical composite is composed of at least one piece of glass and one piece of plastic. The glass is a microwave absorbent glass. The plastic is heated indirectly by heat transmitted to it by the adjacent microwave-heated the glass portion. The glass and plastic's margins are then sealed together with a sealant.

Optical contacting means to adhere two surfaces together through molecular attraction without the use of an adhesive.

Optically correcting means to correct optical imperfections.

Plastic means the physical characteristic of being able to be shaped, molded, or modeled such that the resulting change of shape is permanent.

Glass means an amorphous, vitreous substance that has a disordered molecular arrangement, but is mechanically rigid and capable of transmitting light.

The glass can include silver salts, copper salts gold, palladium, cadmium chalcogenides, noble metal colloids, and ferrites.

The plastic can include, in whole or in part, polycarbonates, polyurethanes, polystyrenes, fluorocarbons and polymethylmethacrylates.

The sealant can include, in whole or in part, silicones, shellac, lacquer, epoxy, silane coupling agents, disilyl crosslinker compounds, epoxy resins, crosslinkable polyethylene vinylacetate terpolymer, polyvinyl butyral, polysulfide, and commercially available, crosslinkable polyethylene vinylacetate terpolymer.

The most preferred silane coupling agents are those which are commercially available and which are recognized by those skilled in the art as being effective coupling agents. In particular, silane coupling agents include N-(2-aminoethyl)-3-aminopropyltrimethoxysilane, 3[2(vinylbenzylamino)ethylamino]propyltrimethoxysilane, 3-methacryloxypropyltrimethoxysilane, 3-glycidoxypropyltrimethoxysilane, triacetoxyvinylsilane, tris-(2-methoxyethoxy) vinylsilane, 3-chloropropyltrimnethoxysilane, 3-aminopropyltrimethoxysilane, vinyltrimethoxysilane, mercaptopropyltrimethoxysilane, mercaptopropyltriethoxysilane and the azide functional silanes of the formula $X_3 SiR'''SO_2N_3$, where X denotes a hydrolyzable group such as an alkoxy, an alkylalkoxy or a chloro radical, and $R'''$ denotes a divalent organic radical.

The syntheses of the disilyl crosslinker compounds are known in the art. The disilylalkyl compounds can be synthesized by reacting choloralkytrialkoxysilane with tetraalkoxysilane (represented by the formula $SiX_4$ where X is an alkoxy group) in the presence of lithium. The bis(trimethoxysilyl)benzene compounds can be synthesized by reducing bis(trichlorosilyl)benzene with lithium aluminum halide followed by methanolysis as described in Preparation and Characterization of Disilylbenzene and Bis(trimethoxysilyl)benzene, Bilow, et al., J. Org. Chem. 26(3) 929, 1961. The disilyl crosslinker can also be synthesized by any of the means taught in U.S. Pat. No. 3,179,612, especially, by the method taught in Example 2 of said patent. The disilyl crosslinker compounds can also be synthesized by reacting polyamines with chloroalkylsilanes according to the method taught in U.S. Pat. No. 4,448,694.

In a preferred embodiment, the glass contains silver salts, copper salts gold, palladium, cadmium chalcogenides, noble metal colloids, and ferrites. The glass and the plastic are placed in a vacuum while microwave radiation is applied to the resulting optical composite. After removal from the microwave radiation, and while still held in a microwave-transparent vice, a sealant is applied to the margins of the glass and the plastic at their junction. The glass and plastic may each be refractive. The glass percentage of the composite is between about 0.01% to 99.99%. The plastic percentage of the composite is between about 0.01% to 99.99%. The glass and plastic each range from being opaque to being transparent.

The vice can include conventional glasses, conventional plastics, and conventional natural and synthetic rubbers.

The microwave-transparent materials can include conventional glasses, conventional plastics, and conventional natural and synthetic rubbers.

Photochromic means a visible and reversible change in light transmission or color that is induced by exposure of the material to electromagnetic radiation.

Refractive means that the material is capable of bending a particular wavelength of light.

Opaque means not transmitting a particular wavelength of light.

Transparent means transmitting at least 99.99% of a particular wavelength of light.

Microwave-transparent means that not absorbing microwave radiation.

In another preferred embodiment, distilled water is placed between the glass and the plastic before microwave radiation is applied.

In another preferred embodiment, the optic fiber is made up of 3 to 4 parts: a central core made of silicon dioxide glass, though other glasses may also be used, for transmitting the optical signals; surrounding the core is a cladding; a buffer coating in turn surrounds the cladding; and an optional final coat, the sheath surrounds the buffer.

Cladding means a thin layer of glass, plastic, or polymer coating with an index of refraction lower than the core, surrounding the core. The function of the cladding is to reflect light back into the core as it moves down the fiber. The cladding may be multi-layered. These cladding layers may be of different indices of refraction. Claddings are usually silica, but other glasses, silicone, and other polymers may be used; however, the refractive index must be lower than the core to allow light to propagate through the fiber.

The buffer coating is a plastic or a polymer that protects the core and cladding from moisture, scratches, and other contamination while imparting additional strength to the fiber.

The sheath is an optional final coating made of metal, plastic or a polymer and provides additional strength, stiffness, protection and resistance to moisture.

In one preferred embodiment, the core is made of glass and polymer cladding is bonded on to the optic fiber using heat generated from microwave radiation absorbed by the optic fiber.

In another preferred embodiment, the core is made of glass and the polymer cladding is optically contacted on to the optic fiber using heat generated from microwave radiation.

In another preferred embodiment, the core is made of glass and a polymer sheath is bonded on to the optic fiber using heat generated from microwave radiation absorbed by the optic fiber.

In another preferred embodiment, the core is made of glass and a buffer coating is bonded on to the optic fiber using heat generated from microwave radiation absorbed by the optic fiber.

While a few presently preferred embodiments of the invention are shown and described, it will be apparent to those skilled in the art that various changes and modifications, such as substituting ultraviolet radiation and ultraviolet absorbing compounds for the present invention's microwave radiation and microwave absorbing compounds, may be made therein without departing from the spirit of the invention or from the scope of the appended claims.

I claim:

1. A method of making a glass and plastic optical composite comprising:

forming a glass with a rigid nature having a center and a margin to a particular shape;

forming a plastic with a plastic nature having center and a main to a shape essentially adapted to receive the shape of the glass; and applying microwave radiation for a time effective to optically correct the formed plastic and optically contact the formed plastic to the formed glass.

2. The method of claim 1 wherein the microwave radiation is applied at about between 10 watts to 100,000 watts and a frequency of about between 3 Ghz to 3000 Ghz.

3. The method of claim 1 wherein the microwave radiation is applied for between about 0.01 minutes to 100 minutes.

4. The method of claim 1 wherein the margin of the plastic is formed with a notch adapted to interlockingly receive the margin of the glass.

5. The method of claim 1 wherein a sealant is applied only to the margins of the glass and the margin of the plastic after the microwave radiation has optically corrected the formed plastic and optically contacted the formed plastic to the formed glass, whereby the center of the glass and the center of the plastic remain devoid of sealant.

6. The method of claim 5 wherein the sealant is capable of being cured by exposure to air.

7. The method of claim 5 wherein the sealant is exposed to microwave radiation for a time effective to enhance the strength of the sealant.

8. A method of making a glass and plastic composite comprising:

forming a glass having a center and a margin to a particular shape;

forming a plastic having a margin and a center to a shape essentially adapted to receive the shape of the glass; and applying microwave radiation for a time effective to affix the formed glass and the formed plastic together; and applying sealant only to the margin of the glass and the margin of the plastic, whereby the center of the glass and the center of the plastic are devoid of the sealant.

9. The method of claim 8 wherein the microwave radiation is applied for between about 0.01 minutes to 100 minutes.

10. The method of claim 8 wherein the microwave radiation is applied at between about 10,000 watts and at a frequency of about between 3 Ghz to 3000 Ghz.

11. The method of claim 8 wherein the margin of the plastic is formed with a notch adapted to interlockingly receive the margin of the glass.

12. The method of claim 8 wherein the sealant is capable of being cured by exposure to air.

13. The method of claim 8 wherein the sealant is exposed to microwave radiation for a time effective to enhance the strength of the sealant.

14. A method of making a glass and plastic composite comprising:

forming a glass having a center and a margin to a particular shape;

forming a plastic having a margin and a center to a shape essentially adapted to receive the shape of the glass;

applying sealant only to the margin of the glass and the margin of the plastic, whereby the center of the glass and center of the plastic are devoid of the sealant; and applying microwave radiation for a time effective to enhance the reaction kinetics of the sealant and optically contact the formed plastic to the formed glass.

15. The method of claim 14 wherein the sealant is capable of being cured by exposure to air.

16. The method of claim 14 wherein the microwave radiation is applied for between about 0.01 minutes to 100 minutes.

17. The method of claim 14 wherein the microwave radiation is applied at between about 10 watts to 10,000 watts and at a frequency of about between 3 Ghz to 3000 Ghz.

18. The method of claim 14 wherein the margin of the plastic is formed with a notch adapted to interlockingly receive the margin of the glass.

* * * * *